United States Patent [19]

Kelkar

[11] Patent Number: 5,814,291

[45] Date of Patent: Sep. 29, 1998

[54] SIMPLIFIED SYNTHESIS OF ANION INTERCALATED HYDROTALCITES

[75] Inventor: Chandrashekhar P. Kelkar, Allegheny County, Pa.

[73] Assignee: Aristech Chemical Corporation, Pittsburgh, Pa.

[21] Appl. No.: 856,157

[22] Filed: May 14, 1997

Related U.S. Application Data

[63] Continuation-in-part of Ser. No. 684,371, Jul. 19, 1996, abandoned.

[51] Int. Cl.⁶ .................................................. C01B 31/30
[52] U.S. Cl. ..................... 423/395; 423/420.2; 423/463; 423/464; 423/465; 423/554
[58] Field of Search ............................. 423/499.1, 420.2, 423/554, 556, 395, 463, 464, 465

[56] References Cited

U.S. PATENT DOCUMENTS 5,362,457  11/1994  Grubbs et al. ........................... 423/432
5,399,329   3/1995  Schutz et al. ........................... 423/432

OTHER PUBLICATIONS

Hackh's *Chemical Dictionary*, Fourth Edition (1969), McGraw–Hill Book Company.

*Primary Examiner*—Wayne Langel
*Attorney, Agent, or Firm*—Robert R. Gavlik

[57] ABSTRACT

The present invention is one-step method for synthesizing a synthetic anion intercalated hydrotalcite material. The method comprises reacting an aluminum source with a magnesium source in the presence of an inorganic acid of the anion to be intercalated, and in the absence of a Group IA metal source. The resulting slurry can be dried to form the final product.

10 Claims, No Drawings

SIMPLIFIED SYNTHESIS OF ANION INTERCALATED HYDROTALCITES

RELATED APPLICATIONS

This application is a continuation-in-part of application Ser. No. 684,371 filed Jul. 19, 1996, now abandoned.

TECHNICAL FIELD

Hydrotalcite is a naturally occurring mineral having the formula:

$$Mg_6Al_2(OH)_{16}CO_3 \cdot 4H_2O$$

Hydrotalcite-like materials or anionic clay minerals have similar structures and have the general formula:

$$M^{II}_{1-x}M^{III}_{x}(OH)_{2-x/y}A^{y-} \cdot mH_2O$$

where $M^{II}$ and $M^{III}$ are divalent and trivalent actions and A is an anion. These materials belong to the pyroaurite-sjogrentie class of minerals, and their crystal structure has been described in the literature (Allmann, R., Acta Cryst. (1968), B24, 972). They have been widely described in the literature (Cavani et al., "Catalysis Today", 11, 173 (1991)).

BACKGROUND OF THE INVENTION

U.S. Pat. Nos. 3,539,306, 4,458,026, 4,539,195, 4,560,545, 4,904,457 and 5,250,279 all teach different methods of synthesis of hydrotalcite with carbonate anions in the interlayer.

There is an increasing interest in the pillaring of hydrotalcite-like materials with inorganic anions other than carbonate in the interlayer. Pillaring has been extensively used with respect to cation replacement in clays. Pillared hydrotalcites are useful as adsorbents, catalysts, and flame retardant in polymers. U.S. Pat. Nos. 5,075,089, 5,225,115 and 5,348,725 all teach a substantially similar process for pillaring hydrotalcites. The process involves first synthesizing hydrotalcite with carbonate in the interlayer as described in the above patents, calcining the hydrotalcite to temperatures of 450°–500° C., and contacting the calcined derivative with a salt solution of the desired anion to be intercalated.

U.S. Pat. Nos. 4,883,533, and 5,075,087 teach a different approach to make phosphate pillared hydrotalcite. The approach again involves the first step as a synthesis of hydrotalcite with carbonate as the interlayer anion, the hydrotalcite is then treated with phosphoric acid which liberates carbon dioxide and results in the formation of phosphate intercalated product. All the above patents teach a pillaring process which is a two-step procedure, the first step being the synthesis of a carbonate containing hydrotalcite. The second step is the anionic substitution of carbonate.

A recent U.S. Pat. No. 5,362,457 teaches a "direct method" for synthesis of anion intercalated hydrotalcites. The method involves reacting an activated magnesia with an aqueous solution containing aluminate, hydroxyl and the selected anion, in the form of a disassociated sodium salt, at 80° C. to directly synthesize anion intercalated hydrotalcite. According to the patent, page 3, lines 7–10, "the direct synthesis route of the present invention requires only one filtering and washing rather than two filterings and washings in the indirect synthesis method". At column 2, line 68 et seq, the patent states the slurry is "filtered and excess ($Na_2O$) is washed from the filter cake. The filter cake is then reslurried and spray dried." The $Na_2O$, which needs to be washed, comes from two sources: sodium aluminate, and the sodium salt of the anion to be intercalated.

PCT application WO 96/05140 utilizes sources other than sodium salts. The application discloses a two-step procedure to make hydrotalcite-like materials; the first step synthesizes a meixnerite phase. According to the application, page 3, lines 17–22, one objective is to "make hydrotalcite and hydrotalcite-like compounds through the further processing of an improved meixnerite product, itself made by combining activated magnesia with a high surface area, transition alumina". The synthesis of the meixnerite intermediate is carried out at temperatures ranging from 80° and 160° C. and pressures ranging from atmospheric to 4.7 atmospheres. According to the application, page 12, lines 24–28, "[a]fter six hours in the reactor, samples were removed and analyzed. Considerable meixnerite was found in these samples. After 22 hours at boiling, conversion was nearly complete." The meixnerite phase was treated with carbon dioxide, oxalic acid, boric acid and stearic acid to make hydrotalcite-like materials with carbonate, oxalate, borate and stearate, respectively.

It is an object of the present invention to produce synthetic anion hydrotalcites in high purity by direct synthesis from alumina, magnesia and the inorganic acid of the desired anion to be intercalated by a procedure which eliminates the need for the "one filtering and washing" step of the previous patent by eliminating the sources that add sodium to the slurry.

It is another object of the present invention to produce synthetic anion hydrotalcites in high purity by direct synthesis from alumina, magnesia and the inorganic acid of the desired anion to be intercalated, and in the absence of any appreciable amount of a Group IA metal source such as Group IA inorganic bases (like NaOH or KOH) as are typically employed in the art. Other excluded sources include Group IA metal salts of the anion to be intercalated such as NaBr, KBr, and NaCl, and other Group IA metal salts such as sodium aluminate.

It is another object of the present invention to produce substantially carbonate free anion intercalated hydrotalcite-like materials without necessitating the use of precautions like purging and blanketing the synthesis slurry.

It is also the objective of the present invention to produce anion intercalated hydrotalcite in a commercially advantageous manner using a low pressure, low reaction time method, and without synthesizing the meixnerite intermediate.

SUMMARY OF THE INVENTION

The present invention includes contacting an aluminum source with a magnesium source in the presence of the acid of the anion to be intercalated, and in the substantial absence of a Group IA metal source, at temperatures in excess of about 40° C. to directly form the anion substituted hydrotalcite. The resulting slurry can be spray dried to obtain the final product. By absence or substantial absence of a Group IA metal source, is meant a reaction wherein Group IA metal sources are either, most preferably, not present at all, or are present, but have no appreciable effect on the reaction. However, the present invention includes reactions wherein amounts of Group IA metal sources may be present, but in concentrations that do not require subsequent processing steps for removal of the metal. This is in contrast to the prior art processes that utilize Group IA metal sources such as Group IA salts, and/or sodium aluminate as appreciable sources for reactants.

The preferred source of alumina is the peptizable form of pseudoboehmite. This form is commercially available as CATAPAL B from Vista Chemicals or Versal 850 from LaRoche Industries. The preferred source of magnesium is magnesium oxide available commercially as MAGCHEM 50 from Martin Marietta.

The acid is selected from the group of ionizable inorganic acids. These include, but are not limited to the following: hydrochloric acid, hydrofluoric acid, hydrobromic acid, hydroiodic acid, sulfuric acid, perchloric acid, nitric acid to produce hydrotalcites with chloride, fluoride, bromide, iodide, sulfate, perchlorate and nitrate anions in the interlayer, respectively.

The inorganic acid acts to peptize the aluminum source and thereby allow the reaction to proceed at an efficient rate. The preferred method is to add the acid to the alumina source to peptize the alumina at 50°–60° C. and then add the magnesium source and raise the temperature to at least 80° C. After completion of the reaction, the slurry is directly spray dried to obtain the final product.

The absence of a Group IA metal source in the reaction mixture alleviates the need for subsequent removal of that metal. For instance, Schutz et al disclose as the preferred embodiment, sodium aluminate as the source of the aluminum cation. However, this will require additional processing steps to remove the sodium. The present invention eliminates the need for such subsequent steps. The Group IA metal is not present in the instant reaction mixture.

DETAILED DESCRIPTION OF THE INVENTION

The aluminum source can be in the form of a reactive oxide, hydroxide or a salt of the anion to be incorporated, the preferred source being pseudoboehmite. In the above synthesis, pseudoboehmite describes small crystallites of boehmite having an X-ray diffraction pattern corresponding to the JCPDS file #21-1307. Pseudoboehmite has the property of being able to disperse with an acid into colloidal size particles (positively charged particles having size less than 1 micron in diameter) without being soluble. The magnesium source may be in the form of oxide, hydroxide or a salt of the anion to be incorporated, the preferred source being magnesium oxide. The magnesium source is added such that the molar ratio of divalent to trivalent metal is about 1:1 to 10:1; preferable between 2:1 and 4:1. The amount of anion is added such that the molar ratio of anion to aluminum is preferably 1:1 for a monovalent anions but may vary from 0.1:1 to 1.2:1 and is preferably 0.5:1 for divalent anions but may vary from 0.05:1 to 0.6:1. In cases where less than the stoichometrically required charge is provided by the anions added to the slurry, the charge is balanced by the hydroxyl anions present in the slurry.

The anions can be added to the slurry either in the acid form or as a salt of magnesium or aluminum. In cases where either salt of magnesium or aluminum is used as a source of the anions, the anions should be no more than 20% excess of the stoichiometrically required amount. Hence, it would be necessary to partially supply either magnesium or aluminum through magnesium oxide or pseudoboehmite. The preferred approach is to add the anions to the slurry through the addition of the corresponding acid. The final pH of the synthesis mixture should be between 7 and 12 but preferably between 8 and 9.

Heating and mixing the above reaction mixture will facilitate crystallization. The reaction time can extend from 0.5 h to several hours, i.e. as much as 72 h or more depending on the reaction temperature and mixing. The crystallization is carried out at a temperature of at least 40° C. and atmospheric pressure. The rate of crystallization can be accelerated by increasing the temperature. The synthesis can also be carried out at higher than atmospheric pressures in a closed system, in which case the temperature can exceed 100° C. but more preferably between 85° and 95° C. and at atmospheric pressure. After the crystallization period, the product consists of a thick homogeneous slurry. The slurry can then be directly dried by any of the conventionally known techniques without requiring any washing.

A dried sample of the slurry shows an X-ray diffraction pattern characteristic to hydrotalcite-like materials. Typical X-ray diffraction lines of a crystalline hydrotalcite made with different anions have been identified and are shown in Table 1. The crystallinity of the material can vary depending on the reaction temperature, time and mixing. The substantial completion of the reaction to form anion intercalated hydrotalcite-like material is detected by the absence of diffraction lines attributable to magnesium oxide in the final product.

It is well known in the hydrotalcite literature (Cavani et al.) that other divalent and trivalent cations can be substituted for magnesium and aluminum in the hydrotalcite lattice. The anion intercalated hydrotalcite-like product of the present invention can also be synthesized using other cations without departing from the scope of the invention.

EXAMPLE 1

3.8 g of pseudoboehmite (Catapal B) was slurried in 125 ml of deionized water in a teflon beaker. 2.2 g of hydrofluoric acid solution (48% HF by weight) was added to the slurry. The suspension was vigorously agitated and heated to 50°–60° C. for 0.5 h. Then 4.46 g of magnesium oxide (MagChem 50 from Martin Marietta) along with 350 ml of deionized water were added to the resulting mixture and heated to 85°–95° C. for 6 h. The molar ratio of magnesium to aluminum in the slurry was 2:1 and the molar ratio of fluoride anion to aluminum was 1:1. A portion of the final slurry was dried and the presence of the hydrotalcite-like phase with fluoride ions in the interlayer was confirmed by X-ray diffraction.

EXAMPLE 2

15.05 g of pseudoboehmite (Catapal B) was slurried in 500 ml of deionized water. 21.7 g of hydrochloric acid solution (37% HCl by weight) was added to the slurry. The suspension was vigorously agitated and heated to 50°–60° C. for 0.5 h. Then 17.85 g of magnesium oxide (MagChem 50 from Martin Marietta) along with 1.5 L of deionized water were added to the resulting mixture and heated to 85°–95° C. for 6 h. The molar ratio of magnesium to aluminum in the slurry was 2:1 and the molar ratio of chloride anion to aluminum was 1:1. A portion of the final slurry was dried and the presence of the hydrotalcite-like phase with chloride anions in the interlayer was confirmed by X-ray diffraction.

EXAMPLE 3

15.05 g of pseudoboehmite (Catapal B) was slurried in 500 ml of deionized water. 37.32 g of hydrobromic acid solution (70% HBr by weight) was added to the slurry. The suspension was vigorously agitated and heated to 50°–60° C. for 0.5 h. Then 17.84 g. of magnesium oxide (MagChem 50 from Martin Marietta) along with 1.5 L of deionized water were added to the resulting mixture and heated to 85°–95° C. for 6 h. The molar ratio of magnesium to aluminum in the slurry was 2:1 and the molar ratio of bromide anion to aluminum was 1:1. A portion of the final slurry was dried and the presence of the hydrotalcite-like phase was bromide anions in the interlayer confirmed by X-ray diffraction.

The average particle size of the resulting spray dried powder was 1 micron. The Mg, Al, Br and C content of the powder were 17.11, 11.07, 23.02, and 0.18 wt %, respectively. The AA and X-ray diffraction results showed that the material was substantially pure bromide intercalated hydrotalcite with minor amounts of carbonate impurities.

EXAMPLE 4

15.0 g of pseudoboehmite (Catapal B) was slurried in 500 ml of deionized water. 51.29 g of hydroiodic acid solution was added to the slurry. The suspension was vigorously agitated and heated to 50°–60° C. for 0.5 h. Then 17.85 g of magnesium oxide (MagChem 50 from Martin Marietta) along with 1.5 L of deionized water were added to the resulting mixture and heated to 85°–95° C. for 3 h. The slurry was then transferred to a teflon-lined autoclave and heated to 200° C. for 24 h. The molar ratio of magnesium to aluminum in the slurry was 2:1 and the molar ratio of iodide anion to aluminum was 1:1. A portion of the final slurry was dried and the presence of the hydrotalcite-like phase was iodide anions in the interlayer was confirmed by X-ray diffraction.

EXAMPLE 5

15.04 g of pseudoboehmite (Catapal B) was slurried in 500 ml of deionized water. 20.0 g of nitric acid solution (70% $HNO_3$ by weight) was added to the slurry. The suspension was vigorously agitated and heated to 50°–60° C. for 0.5 h. Then 17.8 g of magnesium oxide (MagChem 50 from Martin Marietta) along with 1.5 L of deionized water were added to the resulting mixture and heated to 85°–95° C. for 6 h. The molar ratio of magnesium to aluminum in the slurry was 2:1 and the molar ratio of nitrate anion to aluminum was 1:1. A portion of the final slurry was dried and the presence of the hydrotalcite-like phase was nitrate anions in the interlayer was confirmed by X-ray diffraction.

EXAMPLE 6

15.01 g of pseudoboehmite (Catapal B) was slurried in 500 ml of deionized water. 11.13 g of sulfuric acid solution (97% $H_2SO_4$ by weight) was added to the slurry. The suspension was vigorously agitated and heated to 50°–60° C. for 0.5 h. Then 17.8 g of magnesium oxide (MagChem 50 from Martin Marietta) along with 1.5 L of deionized water were added to the resulting mixture and heated to 85°–95° C. for 6 h. The molar ratio of magnesium to aluminum in the slurry was 2:1 and the molar ratio of perchlorate anion to aluminum was 1:1. A portion of the final slurry was dried and the presence of the hydrotalcite-like phase with perchlorate anions in the interlayer confirmed by X-ray diffraction.

EXAMPLE 7

15.01 g of pseudoboehmite (Catapal B) was slurried in 500 ml of deionized water. The slurry was vigorously agitated and heated to 50°–60° C. for 0.5 h. Then 13.25 g of magnesium oxide (MagChem 50 from Martin Marietta) and 28.25 g of magnesium nitrate along with 1.5 L of deionized water were added to the resulting mixture and heated in an autoclave to 200° C. for 24 h. The molar ratio of magnesium to aluminum in the slurry was 2.1 and the molar ratio of nitrate anion to aluminum was 1:1. A portion of the final slurry was dried and the presence of hydrotalcite-like phase was confirmed by X-ray diffraction.

TABLE 1

X-ray Diffraction Pattern
Anion Intercalated Hydrotalcites

| d Spacing (Å) | Relative Intensity |
|---|---|
| Example 1 | |
| 7.09 | 100 |
| 3.67 | 57 |
| 2.5 | 65 |
| 2.23 | 50 |
| 2.06* | 37 |
| 1.5 | 35 |
| Example 2 | |
| 7.37 | 100 |
| 3.83 | 46 |
| 2.52 | 12 |
| 2.28 | 14 |
| 1.5 | 14 |
| Example 3 | |
| 7.47 | 60 |
| 3.86 | 100 |
| 3.01* | 20 |
| 2.71 | 11 |
| 2.64 | 34 |
| 2.27 | 28 |
| 1.51 | 16 |
| Example 4 | |
| 7.99 | 7 |
| 4.13 | 100 |
| 2.80 | 11 |
| 2.30 | 19 |
| 1.51 | 11 |
| Example 5 | |
| 8.11 | 100 |
| 4.25 | 79 |
| 2.53 | 31 |
| 2.31 | 37 |
| 1.50 | 39 |
| Example 6 | |
| 7.47 | 100 |
| 3.93 | 20 |
| 2.45 | 24 |
| 2.30 | 28 |
| 1.50 | 20 |
| Example 7 | |
| 7.33 | 100 |
| 3.81 | 88 |
| 2.53 | 56 |
| 2.27 | 56 |
| 1.95 | 35 |
| 1.81 | 23 |
| 1.51 | 26 |
| 1.49 | 28 |

*non-hydrotalcite reflection

I claim:

1. A method of making synthetic hydrotalcite-like material having at least one inorganic anion intercalated therein comprising the steps of:

(a) contacting an aluminum source with a magnesium source and at least one source of said inorganic anion, and in the absence of a Group IA metal source, at a temperature of at least about 40° C. to form a slurry, wherein said at least one source of said inorganic anion is an inorganic acid; and (b) drying said slurry.

2. The method of claim 1 wherein the aluminum source is a reactive oxide, hydroxide or salt of the inorganic anion.

3. The method of claim 1 wherein the aluminum source is pseudoboehmite.

4. The method of claim 1 wherein the magnesium source is an oxide, hydroxide, or salt of the inorganic anion.

5. The method of claim 1 wherein the magnesium source is magnesium oxide.

6. The method of claim 1 wherein the ratio of magnesium to aluminum is about 1–10:1.

7. The method of claim 1 wherein the ratio of magnesium to aluminum is 2–4:1.

8. The method of claim 1 wherein the molar ratio of anions to aluminum is 0.1–1.2:1.

9. The method of claim 1 wherein said inorganic acid is selected from the group consisting of hydrofluoric acid, hydrochloric acid, hydrobromic acid, hydroiodic acid, sulfuric acid, nitric acid and perchloric acid.

10. The method of claim 1 wherein the inorganic acid is hydrobromic acid.

* * * * *

UNITED STATES PATENT AND TRADEMARK OFFICE
CERTIFICATE OF CORRECTION

PATENT NO : 5,814,291
DATED : September 29 1998
INVENTOR(S): Chandrashekhar P. Kelkar It is certified that error appears in the above-identified patent and that said Letters Patent is hereby corrected as shown below:

In the first line of the text of the Abstract before "one step" insert --a--

In the fifth line of the Abstract after "intercalated" delete --,--

In Column 5, Line 40, delete "was" and insert in its place "with"

In Column 5, Line 55, before "confirmed" insert --was--

Signed and Sealed this

Fourth Day of January, 2000

Attest:

Attesting Officer

*Acting Commissioner of Patents and Trademarks*